United States Patent [19]
Sato et al.

[11] 3,947,658
[45] Mar. 30, 1976

[54] PROTECTOR FOR THE PLATE-SHAPED HEATING ELEMENT

[75] Inventors: Masaki Sato; Haruhisa Hayashi, both of Tokyo, Japan

[73] Assignees: Kureha Kagaku Kogyo Kabushiki Kaisha, Tokyo; Toyo Boseki Kabushiki Kaisha, Osaka, both of Japan

[22] Filed: Mar. 21, 1975

[21] Appl. No.: 560,749

Related U.S. Application Data

[63] Continuation-in-part of Ser. No. 334,545, Feb. 22, 1973, abandoned.

[30] Foreign Application Priority Data

Feb. 22, 1972 Japan.............................. 47-18012

[52] U.S. Cl................................. 219/504; 219/481
[51] Int. Cl.² ............................................. H05B 1/02
[58] Field of Search.................. 338/225, 22 R, 23; 219/481, 504, 505, 538, 544

[56] References Cited
UNITED STATES PATENTS

| | | | |
|---|---|---|---|
| 1,263,181 | 4/1918 | Winger | 338/225 |
| 3,243,753 | 3/1966 | Kohler | 219/504 |
| 3,251,620 | 8/1973 | Yuasa | 338/325 |
| 3,571,777 | 3/1971 | Tully | 219/504 |
| 3,793,716 | 2/1974 | Smith-Johannsen | 219/504 |

Primary Examiner—J. D. Miller
Assistant Examiner—Fred E. Bell
Attorney, Agent, or Firm—Sughrue, Rothwell, Mion, Zinn & Macpeak

[57] ABSTRACT

A heating assembly having a protector for its sheet-type heating element, which is made from a sheet containing certain electroconductive fibrous or particulate materials such as carbon fibers. A detector element is formed on an intermediate resin layer having a negative temperature coefficient of resistivity, and two electrode layers are adhered to the opposite surfaces of the intermediate layer. The detector element is combined with or adhered to the sheet-type heating element, so that the whole surface of the heating element is completely covered thereby. A controlling circuit is connected between the detector element and the sheet type heating element.

1 Claim, 2 Drawing Figures

PROTECTOR FOR THE PLATE-SHAPED HEATING ELEMENT

This application is a continuation-in-part of application Ser. No. 334,545, filed Feb. 22, 1973 now abandoned.

BRIEF EXPLANATION OF ACCOMPANYING DRAWINGS

Figure 1:
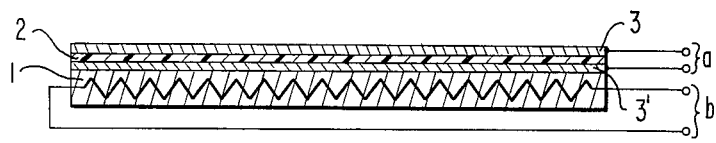
Figure 2:
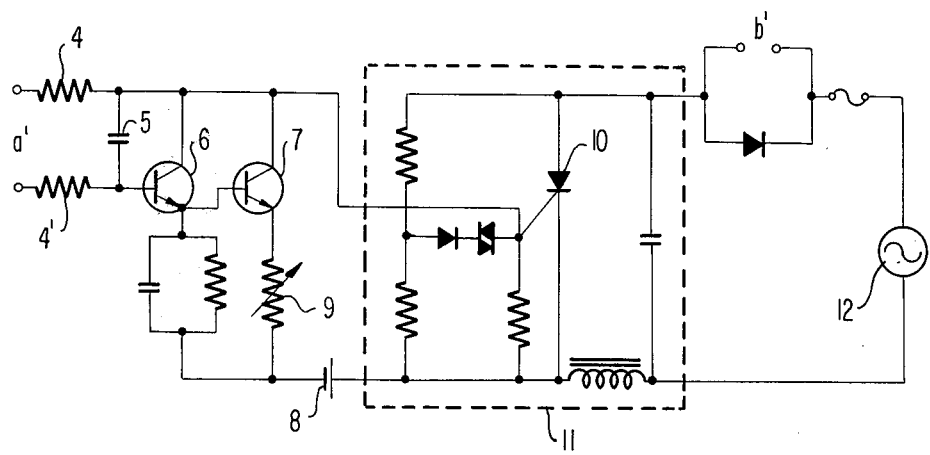

FIG. 1 shows a cross sectional view of the sheet-type heating element and a detector element of this invention wherein the detector element is adhered to said heating element, and FIG. 2 shows an example of a controlling circuit used for the sheet-type heating element.

DETAILED EXPLANATION OF THE INVENTION

This invention relates to a protector for a sheet-type heating assembly composed of a sheet-type heating element and a sheet-type detector element applied to the whole surface of the heating element.

The sheet type heating assembly is useful in various fields as a more suitable heating device than that composed of electrical resistance wire such as nichrome wire, because the sheet-type assembly is characterized by the generation of heat evenly over its whole surface area whereas a nichrome wire device generates heat unevenly.

The heating element of above-mentioned sheet-type heating assembly takes the form of, in a sense, a multiple network circuit by the arrangement of conductive materials throughout the sheet, so that the even heat generation occurs at all points of its broad surface area. It is impossible to make the same effective sheet type heating element by using nichrome wire or other metal wire, because of the difficulty of working the wire into the form of such a multiple network circuit.

Several kinds of sheet-type heating elements are easily made by reference to the prior art.

A thin, mixed paper composed of carbon fiber and employed in this invention as a heating element, can be easily obtained by passing a mixture consisting of more than 40 percent by weight of carbon fiber and less than 60 percent by weight of pulp through a paper making machine with suitable amounts of binding agent to form a sheet in the thickness range of from 0.3 mm to 1.5 mm. The surface resistance of this paper is controllable within the range of from 5 ohms to 15 ohms by the selection of carbon fiber content and thickness of the sheet.

Another sheet-type heating element which can be used is one which is composed of a polymerized carbon layer grafted upon the surface of glass fabrics.

The sheet type heating assembly can be applied to various fields as a suitable heating device, such as a cooling tower heater, a roof heater, a panel heater for railroad control boxes and living rooms, etc.

In the use of a sheet-type heating assembly, the localized heat accumulation or abnormal over-heating is often caused by the placing of an object on the sheet-type heating assembly or by other reasons. These localized and abnormal heat accumulations can not be prevented by employing the usual controller means, such as thermal fuse or a thermostat, as the surface area of the sheet-type heating assembly increases. Besides, a thermal fuse, thermostat or the like controller means can not be attached to the wide surface of a thin sheet-type heating assembly, such as a carpet or blanket.

Recently, a new type heating assembly was disclosed, and which is composed of a specific wire having two continuous fibrous or ribbon-shaped conductors, one a heating conductor and the other a signal conductor separated from the former by a little distance; and a certain temperature sensitive resistive layer, by which abnormal heat generation anywhere along the heating conductor can be detected.

The principle of the actuation in regard to this detection system is to convert the leakage current passing from the heating conductor through the detection layer to a signal current which controls the electric power input to the heating element.

The rise of temperature in the detection layer is accompanied by a decrease thereof the electric resistance of and, consequently, by an increase in the leakage current.

If the local overheating occurs, necessarily accompanied by a rise of temperature on the same local area in the detection layer, the leakage current will increase in response to the decrease in resistance of the detection layer composed of a steadily heating area and an abnormally overheating area.

However, there are many difficulties barring the practicable application of this principle to a sheet-type heating assembly.

Firstly, the heating element of this invention has a sheet shape, in contrast to the wire type element having fibrous wire shape, and so the detection layer is applied to the whole surface area of the sheet shaped heating element in order to detect leakage current caused by abnormal heat generation anywhere in the sheet.

This fact makes it without result to apply a wire shaped conductor as the signal current receiver.

Secondly, the sheet type heating element has roughened surfaces because of the discontinuous fibrous or particulate materials, so that any discharge from the surfaces would disturb the proper actuation of the detector by the leakage current from anywhere in an abnormally over heated region.

Therefore, the direct use of leakage current flow from a sheet type heating element for actuation of protector is to be avoided.

Other requirements for making use of a sheet type heating element are the eveness of the several components, such as the thickness of the detection layer, the same resistive value at all points of the sheet etc. This invention provides a protector system for a sheet-type heating element, which system resolves the above-mentioned difficulties.

This invention also provides a most effective detection circuit for a sheet-type heating assembly incorporating a sheet shaped heating element having a broad surface area.

The said detection circuit excludes the heating element, contrary to the prior art, and consists of a thin film layer of temperature sensitive resistive materials, such as Nylon 12 film, and two separate plate-shape electrodes having the same length and width as the resistive film which is sandwiched completely between these electrode plates.

The detection circuit is connected with the controlling circuit which is connected with the heating element which is completely covered with a insulating layer, whereby the protector system properly actuated without the aforementioned disturbance.

It is preferable to use direct current in the detective circuit for the more reliable actuation.

As the thickness of the detecting part is less than 0.2 mm., the controlling device of this invention can be applied to an extremely thin sheet-typed heating element.

The detecting part and the heating element can be combined with each other after laminating both of them; otherwise, the detecting part is adhered to the heating element by a binder layer.

More specific embodiments of this controlling device will be explained with reference to the accompanying drawings.

In a FIG. 1, a detecting part, composed of two electrode layers 3, 3' and an intermediate resin layer 2 whose resistivity varies remarkably with the change of temperature, is laminated on a sheet type heating element 1.

In FIG. 2, numerals 4,4' indicate protective resistors, numeral 5 indicates a condenser for eliminating the induced current and noise, numerals 6, 7 indicate amplifier transistors, numeral 8 indicates an electric power source for actuating the transistors, numeral 9 shows a variable resistor for predetermining the controlling temperature, numeral 11 indicates a controlling circuit using a thyristor 10, and numeral 12 indicates an A.C. power source.

The terminals a, b in the FIG. 1 are connected to terminals a', b' in FIG. 2, respectively.

The thyristor 10 is usually kept in the "on state", and the electric current flows through the sheet type heating element 1 connected to the terminals (b) to generate heat. If abnormal overheating is caused at any spot on the sheet type heating element, the resistivity of resin layer 2 decreases, and accordingly, the resistance between the terminals (a) is decreased to a faint current flow from the power source 8.

This faint current is amplified by the transistors 6,7 and their output voltage is applied to the gate of the thyristor. As this voltage serves as a negative bias, the current angle of the electric current through the thyristor becomes small to decrease the current through the heating element. The decrease of this electric current changes continuously in accordance with the degree of the overheating. The temperature to be detected can be predetermined by the variable resistor 9.

| EXAMPLE | |
|---|---|
| the resin layer | Nylon 12 thickness 50μ surface area 30 cm × 40 cm |
| the electrode layer | Aluminum thickness 50μ surface area 30 cm × 40 cm |
| heating element | Carbon fiber-pulp mixing paper heating element, surface area 30 cm × 40 cm. |

| -continued | |
|---|---|
| EXAMPLE | |
| | electric power density 250 w/m$^2$ |

A sheet type heating assembly having the structure as shown in FIG. 1 and using the above-listed materials was placed on a heat insulating urethane sheet (30 cm × 40 cm), and a smaller urethane sheet (20 cm × 30 cm) was put on the heating assembly to cause the heat accumulation and localized overheating. The test results are as follows:

| temperature without heat accumulation | | 50°C |
|---|---|---|
| temperature with the heat accumulation | not controlled — heat accumulated zone | 110°C |
| | zone of no heat accumulation | 52°C |
| | controlled — heat accumulated zone | 80°C |
| | zone of no heat accumulation | 47°C |

As particularly described above, the temperature of the sheet type heating assembly increases up to 110°C in 60 min. by placing thereon only the heat insulating sheet. The temperature will continue to rise with the lapse of time. On the other hand, the temperature of the sheet type heating assembly of this invention having the temperature controlling device is raised only for 80°C in 10 min. and then kept at that temperature.

Therefore, this invention provides a device capable of detecting the localized over-heating of the sheet type heating assembly at any region of the latter, controlling continuously the electric current flowing through the heating element and thereby keeping the temperature of the sheet type heating assembly surface below the predetermined temperature.

This device can be also used as a temperature controlling device which detects the temperature of the whole heating element, in addition to the prevention of localized and abnormal overheating.

While this invention has been described with reference to particular embodiments thereof, it will be understood that numerous modifications may be made by those skilled in the art without actually departing from the scope of this invention.

Therefore, the appended claim is intended to cover all such equivalent variations as coming within the true spirit and scope of the invention.

What is claimed is:

1. A sheet type heating assembly having a broad surface area and comprising: a protecting device composed of an intermediate resin layer having a negative temperature coefficient of resistivity and two plate shaped electrodes adhered to opposite surfaces of the intermediate layer; a sheet type heating element comprising an indefinite number of discontinuous conductive materials forming a multiple network circuit, the protecting device being combined with the heating element completely by an insulating binder; and a temperature controlling circuit connected between said electrodes and said heating element for controlling the application of electric power to said heating element to maintain the temperature of said broad surface below a predetermined value.

* * * * *